United States Patent [19]

Leslie et al.

[11] Patent Number: 4,750,127
[45] Date of Patent: Jun. 7, 1988

[54] ENERGY COMPENSATED TARGET SPEED FOR AIRCRAFT DESCENT

[75] Inventors: Ralph S. Leslie, Bothell; Robert L. Allison, Redmond, both of Wash.

[73] Assignee: The Boeing Company, Seattle, Wash.

[21] Appl. No.: 793,572

[22] Filed: Oct. 31, 1985

[51] Int. Cl.⁴ ............................................. G06F 15/50
[52] U.S. Cl. .................................. 364/428; 73/178 T; 244/183
[58] Field of Search .............. 364/433, 434, 440, 439, 364/428, 430, 158, 442; 244/178, 180, 182, 183; 73/178 T

[56] References Cited

U.S. PATENT DOCUMENTS

| | | | |
|---|---|---|---|
| 3,077,557 | 2/1963 | Joline et al. | 318/489 |
| 3,230,507 | 1/1966 | Holt | 340/23 |
| 3,258,582 | 6/1966 | Winblade et al. | 235/150.22 |
| 3,285,067 | 11/1966 | Greene | 73/178 |
| 3,496,769 | 2/1970 | Vietor | 73/178 |
| 3,641,323 | 2/1972 | Hughes et al. | 235/150.2 |
| 3,668,622 | 6/1972 | Gannett et al. | 340/27 |
| 3,748,900 | 7/1973 | Lindquist | 73/178 |
| 3,758,765 | 9/1973 | Vietor | 235/150.26 |
| 3,774,017 | 11/1973 | Zagalsky | 235/150.2 |
| 3,789,661 | 2/1974 | Melsheimer | 73/178 |
| 3,868,497 | 2/1975 | Vietor | 235/150.27 |
| 3,875,379 | 4/1975 | Vietor | 235/150.22 |
| 3,895,528 | 7/1975 | Sturgeon | 73/178 |
| 3,901,466 | 8/1975 | Lambregts | 244/180 |
| 3,916,688 | 11/1975 | Dendy et al. | 73/178 T |
| 3,980,258 | 9/1976 | Simeon | 244/182 |
| 3,989,208 | 11/1976 | Lambregts | 244/182 |
| 3,989,208 | 11/1976 | Lambregts | 244/182 |
| 3,998,411 | 12/1976 | Blechen | 244/188 |
| 4,127,249 | 11/1978 | Lambregts | 244/191 |
| 4,232,839 | 11/1980 | Sicre | 244/188 |
| 4,312,041 | 1/1982 | DeJonge | 364/442 |
| 4,387,360 | 6/1983 | Jourdan et al. | 364/430 X |
| 4,413,320 | 11/1983 | Brandau et al. | 364/428 |
| 4,467,429 | 8/1984 | Kendig | 364/433 |
| 4,471,439 | 9/1984 | Robbins et al. | 364/433 |
| 4,488,235 | 12/1984 | Miller | 364/433 |
| 4,536,843 | 8/1985 | Lambregts | 364/434 |

OTHER PUBLICATIONS

D. O. Jackson, A. A. Lambregts, "727 Approach Energy Management System Avionics Specification (Preliminary)", NASA CR-137906, Boeing Commercial Airplane Co., Aug. 1976.

Robert L. Allison, "Application of NASA-ARC Delayed Flap Approach Procedures to Boeing 727 Airplane (Final Report)", NASA-CR-137907, Boeing Commercial Airplane Company, Feb. 1977.

Primary Examiner—Parshotam S. Lall
Assistant Examiner—Thomas G. Black
Attorney, Agent, or Firm—Christensen, O'Connor, Johnson & Kindness

[57] ABSTRACT

Energy compensation means (64) for an onboard aircraft flight management system (12). The energy compensation means may be used to eliminate unwanted throttle activity during unscheduled level segments (80) in a descent path. The flight management system includes means for enabling selection of various flight modes including a descent mode, means for determining a descent path, including target speed and target altitude (70) profiles as a function of aircraft position, and means for providing information regarding the aircraft current altitude, current position, current calibrated airspeed (CAS) and current true airspeed (TAS). The flight management system also includes means operative in descent mode for providing a target signal ($V_{TGT}$) representing the target speed for the descent path for the current aircraft position, and display means (16) responsive to the target signal for displaying the target speed. The energy compensation means operates to adjust the target speed downward when the current altitude of the aircraft exceeds the target altitude for the current aircraft position. The adjustment may be computed such that the total kinetic plus potential energy of the aircraft is equal to the total kinetic plus potential energy that the aircraft would have if it were flying at the target speed and altitude for its current position. An approximate energy compensation technique may be used in which the target speed is adjusted downward by an amount proportional to the difference ($\Delta h$) between the current altitude and the target altitude for the current aircraft position.

10 Claims, 2 Drawing Sheets

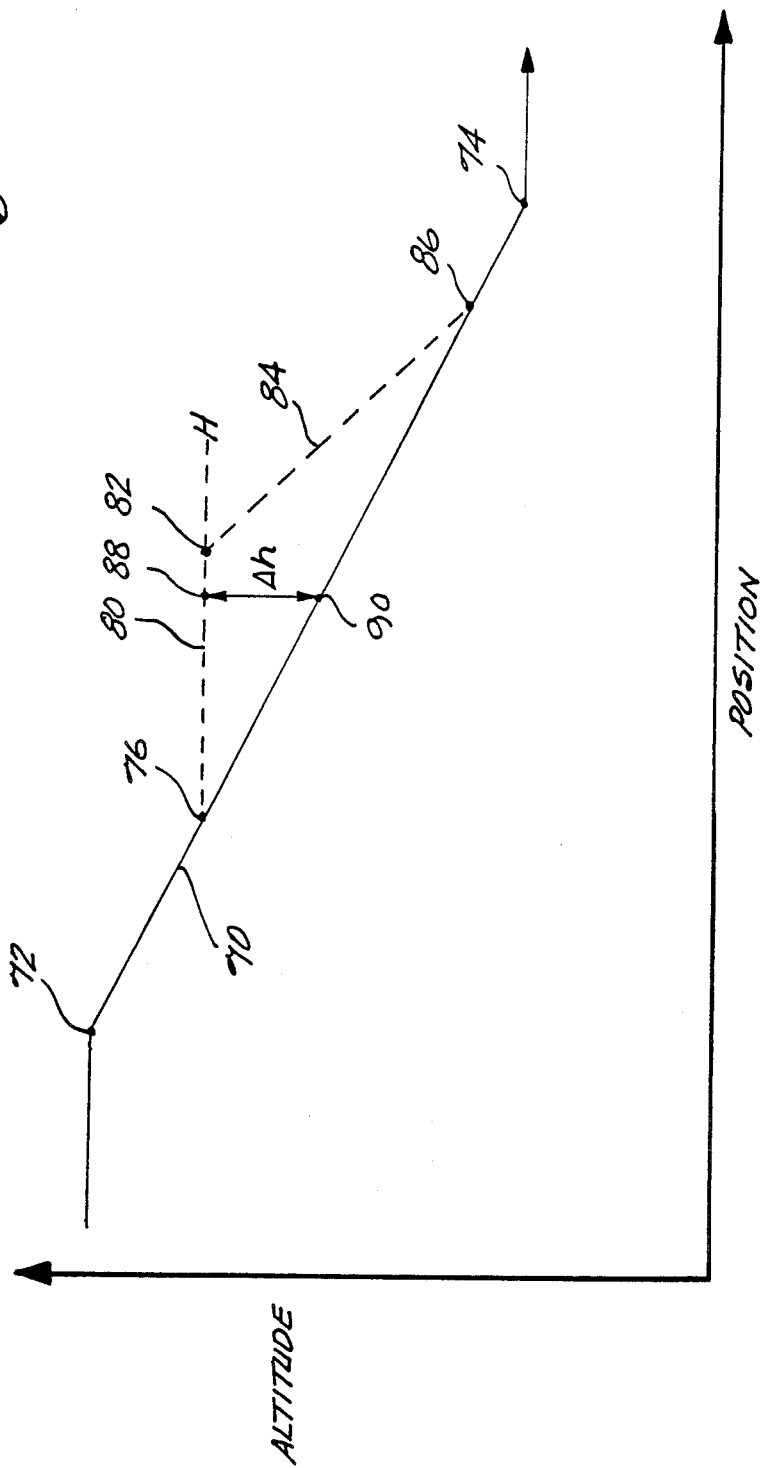

ENERGY COMPENSATED TARGET SPEED FOR AIRCRAFT DESCENT

FIELD OF THE INVENTION

This invention relates to onboard aircraft flight management computer systems, and in particular to such systems that provide the crew with target speed information during descent.

BACKGROUND OF THE INVENTION

The flight management computers installed on the present generation of commercial jet aircraft provide a new technique for reaching a defined end-of-descent point with great precision. The technique involves construction of a descent path, based on the idle thrust performance of the aircraft, which descent path begins at a computed top-of-descent position and terminates at the desired end-of-descent position.

Ideally an aircraft, once cleared for descent, is left alone to perform that descent without further interaction with the Air Traffic Control (ATC) system. In the current ATC environment, however, descent clearances are to some intermediate altitude with progressively lower altitudes assigned as the descent proceeds. Whenever a lower altitude clearance is not received in a timely manner, the crew is required to level the airplane at the last altitude to which they have been cleared. When leveling occurs, the airplane travels above the desired idle thrust descent path.

In prior flight control systems, when leveling in descent, the throttle comes forward (increases thrust) to maintain the descent target speed. With respect to the optimum idle descent path, this throttle activity represents unwanted energy being added to the airplane. Once the aircraft is cleared to resume the descent, speed brakes must be used as the airplane regains the descent path to dissipate the energy added by the increased thrust during the level flight segment. The addition and dissipation of this energy results in an increased fuel cost for the flight. In addition, as the aircraft descends to regain the desired idle thrust descent path, the crew has no direct cue indicating when sufficient energy has been dissipated by the speed brakes to enable the aircraft to regain the desired descent path without further use of the speed brakes or throttle.

SUMMARY OF THE INVENTION

The present invention provides energy compensation means for an onboard aircraft flight management system that may be used to eliminate unnecessary throttle activity during unscheduled level segments in a descent path.

The energy compensation means of the present invention is intended for use in conjunction with a flight management system for an aircraft. The flight management system includes means for enabling selection of various flight modes including a descent mode, means for determining a descent path, including target speed and target altitude profiles as a function of aircraft position, and means for providing information regarding the aircraft's current altitude, current position, current calibrated airspeed and current true airspeed. The flight management system also includes means operative in descent mode for providing a target signal representing the target speed for the descent path for the current aircraft position, and display means responsive to the target signal for displaying the target speed. The energy compensation means comprises means for adjusting the target sped downward when the current altitude of the aircraft exceeds the target altitude for the current aircraft position. The amount that the target speed is adjusted downward may be determined such that the current total kinetic plus potential energy of the aircraft is equal to the total kinetic plus potential energy that the aircraft would have were it flying at the target speed and altitude for its current position. An approximate energy compensation technique may be used in which the target speed is adjusted downward by an amount proportional to the difference between the current altitude and the target altitude for the current aircraft position.

BRIEF DESCRIPTION OF THE DRAWINGS

FIG. 2 is a graph showing a descent altitude profile and deviations therefrom.

DETAILED DESCRIPTION OF THE INVENTION

Figure 1:
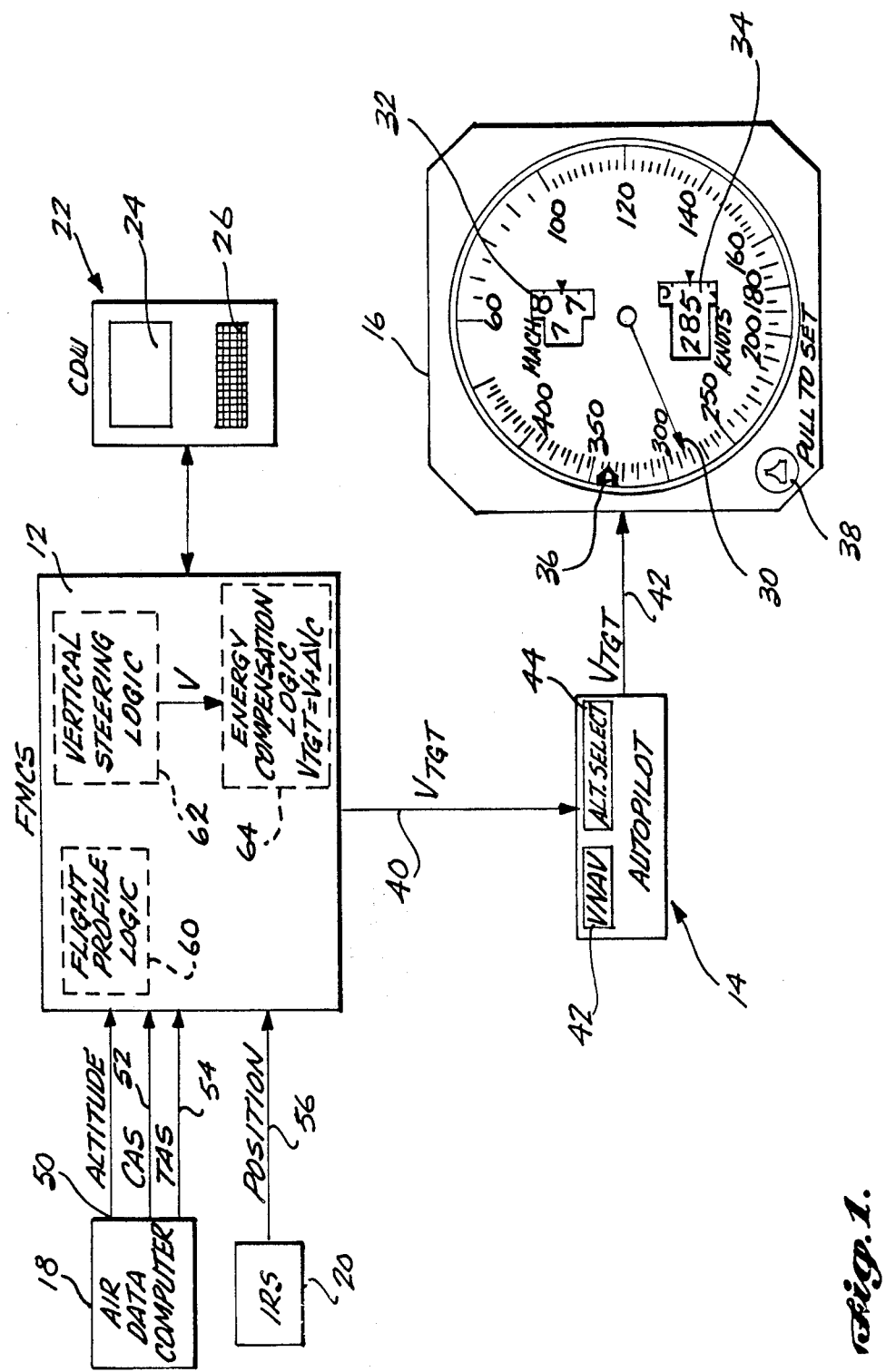
FIG. 1 is a schematic view of a portion of an onboard digital avionics system that includes the energy compensation means of the present invention.

FIG. 1 is a partial block diagram of an onboard digital avionic system in which the present invention is incorporated. The avionic system illustrated in FIG. 1 includes flight management computer system (FMCS) 12, autopilot 14, airspeed indicator 16, air data computer 18, inertial reference system (IRS) 20, and control display unit (CDU) 22. CDU 22 includes display screen 24 and keyboard 26. Autopilot 14 includes VNAV switch 42 and altitude selection control 44 whose functions are described below. Airspeed indicator 16 is a conventional instrument that is located in the cockpit of the aircraft. The airspeed indicator includes airspeed pointer 30, Mach number display 32, airspeed display 34, airspeed bug 36, and manual setting knob 38. Airspeed pointer 30 and airspeed display 34 indicate the current calibrated airspeed of the aircraft. Mach number display 32 displays the current computed Mach number for the aircraft.

Airspeed bug 36 is a movable pointer that is used to indicate a target calibrated airspeed. The airspeed bug may be set either manually by the crew or automatically by the avionic system. Manual setting of the airspeed bug is accomplished by pulling knob 38 out and then rotating the knob to adjust the position of the bug. When pulled out, knob 38 overrides automatic control of the airspeed bug. When knob 38 is not pulled out, the position of the airspeed bug is controlled by a target speed signal $V_{TGT}$ that is transmitted periodically (e.g., every 100 milliseconds) from autopilot 14 to the airspeed indicator over line 42. When the autopilot is engaged, $V_{TGT}$ is derived from an identical signal provided by FMCS on line 40. The present invention comprises an improved means for calculating the target speed $V_{TGT}$ by FMCS 12 during descent.

FMCS 12 is a conventional component of modern commercial jet aircraft, and performs flight management and planning, navigation, guidance and related functions. One of the important fuctions of the FMCS is the computation of flight paths and flight profiles. A flight path is simply the route that the aircraft will fly between takeoff and landing, and includes both horizontal (latitude and longitude) and vertical components. A distinct flight path is computed for each flight phase such as climb, cruise and descent. For a given flight phase, a vertical flight profile is calculated that specifies the aircraft's target speed and target altitude at each horizontal position along the flight path.

FMCS 12 includes flight profile logic 60, vertical steering logic 62 and energy compensation logic 64. The vertical steering logic and energy compensation logic are discussed below. Flight profile logic 60 operates to compute flight profiles in response to input from the crew via CDU 22. The flight profile logic accepts specification of the altitudes and speeds to be achieved at various waypoints along the route. Altitudes may be entered as altitudes which the aircraft must arrive "at," "at or above," or "at or below." Speed constraints are considered by the system as "not to exceed" speeds. Vertical constraint information can be preplanned within the navigation data base within the FMCS, and can be called from storage along with the lateral profile of a selected route. The FMCS will also automatically provide a default vertical profile whenever a lateral profile is generated. This default is termed the economy mode for each of the flight phases (e.g., climb, cruise and descent), and includes consideration of any restrictions applicable over the selected routes, such as the U.S. restriction that the airspeed be below 250 knots below 10,000 feet. Flight profiles are computed so as to minimize cost, and are governed by a cost index factor that indicates the balance between operating costs that are a direct reflection of flight time (e.g., crew salaries) and fuel costs.

For descent, the crew may use CDU 22 to select either a PATH mode or a SPEED mode. For either mode, a minimum cost flight profile is constructed based on the specified cost index factor, as well as upon wind speed, predicted anti-ice usage, and any intermediate waypoint altitudes or speed constraints. In SPEED mode, the autopilot will control directly to target speed at the expense of precise altitude control. The improvement of the present invention relates to PATH mode only, for reasons that will become apparent below. For PATH mode descents, speed and altitude profiles are first predicted and stored at each of a series of breakpoints, each breakpoint comprising a break in the predicted speed/altitude profiles. Each pair of consecutive breakpoints forms a segment of the descent profile. When the speed changes in a segment, a gradient is calculated and used to change the target speed linearly as a function of the distance between the breakpoints.

During the actual flight of the aircraft, FMCS 12 continually receives information relating to the current state of the aircraft, and uses such information to update its flight profile data and to generate commands that may be used by the autopilot, autothrottle and/or crew to maintain the computed profile. In particular, referring to FIG. 1, FMCS 12 receives current altitude, calibrated airspeed (CAS) and true airspeed (TAS) data from air data computer 18 via lines 50, 52 and 54 respectively. The FMCS also receives information indicating the aircraft's current position from inertial reference system (IRS) 20 via line 56. Vertical steering logic 62 computes vertical steering commands, i.e., commands for thrust, pitch and related functions, for use by the autopilot in guiding the aircraft to its desired flight profile. The vertical steering logic generates the vertical steering commands by comparing the flight profiles calculated by flight profile logic 60 with the current aircraft state as indicated by signals from air data computer 18 and IRS 20. Vertical steering logic 62 also generates a target speed V that indicates the instantaneous speed that the aircraft should have at its current position along the flight path.

In order to fly a PATH mode descent, the vertical navigation function (VNAV) of autopilot 14 must be engaged. Such function is engaged by actuating VNAV switch 42 that is located on a mode control panel associated with the autopilot. The calculation of a PATH descent profile includes calculation of a top-of-descent point, i.e., the position in space at which the descent commences. Typically, VNAV will be engaged during the cruise portion of a flight, in which case the aircraft will automatically begin a PATH mode descent upon arrival at the computed top-of-descent point. During a PATH mode descent, vertical steering logic 62 of FMCS 12 transmits appropriate requests to the autopilot and autothrottle (not shown) to maintain the calculated descent profile. In particular, the vertical steering logic issues a command to the autothrottle that results in the autothrottle going into an ARM condition in which the throttles are retarded to idle. The vertical steering function also issues pitch commands to autopilot 14. The autopilot responds to the pitch commands by controlling the elevators so as to maintain the target altitude profile computed by flight profile logic 60 for the PATH mode descent. The target speed V for each position in the descent is also generated by vertical steering logic 62 and is input to energy compensation logic 64. The energy compensation logic modifies the target speed by an energy compensation term $\Delta V_c$, and outputs the modified target speed $V_{TGT}$ to autopilot 14 via line 40. Details of the calculation of the energy compensation $\Delta V_c$ are described below. With the exception of energy compensation logic 64, all of the elements shown in FIG. 1 are known and in use on modern commercial jet aircraft.

The problem solved by the present invention may be illustrated with reference to FIG. 2. Assume that flight profile logic 60 has computed a PATH mode descent profile that includes altitude profile 70 between breakpoint 72 and breakpoint 74. Profile 70 is one in which the altitude of the aircraft decreases at a constant rate. The velocity profile corresponding to altitude profile 70 is not illustrated, but would typically comprise either a constant velocity or a velocity that decreases linearly with position. Assume that the aircraft is following profile 70 above point 76, at idle thrust, and is then instructed by the air traffic control system to level off at altitude H pending further instructions. The crew would typically respond by entering altitude H into autopilot 14 via altitude selection control 44. As a result, the aircraft would enter a SPEED mode in which the aircraft, upon reaching point 76, will level off and fly constant altitude path 80 at a constant speed. The constant speed will be the speed calculated for the PATH descent profile at point 76.

In order for the aircraft to maintain its predetermined speed along path 80, it will be necessary to increase the thrust (above idle) and thereby add energy to the aircraft. When the altitude restriction H is later removed at point 82, the crew will enter a new (lower) minimum altitude into autopilot 14 via the altitude selection control, and the aircraft will reenter the PATH descent mode and begin to descent back towards profile 70 along path 84. Without the present invention, airspeed bug 36 would at this time indicate the target speed that would be appropriate for the aircraft at its present horizontal position along path 70. In order to reach or retain such target speed during descent along path 84, it will be necessary for the crew to utilize speed brakes in order to remove the energy added to the aircraft by the use of thrust along path 80. This use of thrust along path 80 and speed brakes along path 84 results in an undesirable increase in the fuel cost of the flight.

In accordance with the present invention, energy compensation logic 64 within FMCS 12 modifies the target speed V by energy compensation term $\Delta V_c$ whenever the aircraft is above its predetermined descent profile in order to eliminate the unwanted use of energy described above.

The modification or compensation term $\Delta V_c$ is computed based upon the principle that the total energy of the aircraft at a given point 88 along flight path 80 should be identical to the total energy that the aircraft would possess at point 90 at the same position along the computed flight profile. In particular, the additional potential energy possessed by the aircraft at point 88 due to altitude deviation $\Delta h$ should be matched by a corresponding decrease in the kinetic energy of the plane at point 88, i.e., by a corresponding decrease in the aircraft speed at point 88. Setting the total kinetic plus potential energy of the aircraft at point 88 equal to the total kinetic plus potential energy at point 90, one may write:

$$\tfrac{1}{2}MV1^2 + Mgh = \tfrac{1}{2}M(V1+\Delta V1)^2 + Mg(h+\Delta h) \quad (1)$$

where M is the aircraft mass, V1 is the true airspeed that the aircraft would have at point 90 on descent profile 70, g is the acceleration due to gravity, h is the altitude that the aircraft would have at point 90, $\Delta V1$ is the difference between the compensated target airspeed (expressed as true rather than as calibrated airspeed) at point 88 and the uncompensated target airspeed (also expressed as true airspeed) at point 90, and $\Delta h$ is the altitude deviation of point 88 with respect to point 90. Equation (1) can be expanded and rearranged to produce:

$$\Delta V1 = -(g/V1) \cdot \Delta h \quad (2)$$

where it has been assumed that the term proportional to $(\Delta V1)^2$ is negligible compared with remaining terms. The quantity V1, the true airspeed that the aircraft would have at point 90 along the flight profile, is typically not available or otherwise required by the flight management computer system. Although V1 could be computed for each point along the flight profile, such a computation would be unduly burdensome, given the high update rate (e.g., once every 200 milliseconds) specified for the target speed signal $V_{TGT}$. However, an approximate value for V1 can be obtained by assuming that the ratio of calibrated airspeed to true airspeed at point 88 is equal to the same ratio at point 90. Thus if we define V to be the calibrated airspeed at point 90 (as determined by vertical steering logic 62), $V_t$ to be the current true airspeed (TAS) at point 88, and $V_c$ to be the current calibrated airspeed (CAS) at point 88, then one may write:

$$V_c/V_t = V/V1 \quad (3)$$

Solving Equation (3) for V1 and substituting in Equation (2), one obtains:

$$\Delta V1 = -\frac{g \cdot V_c}{V \cdot V_t} \cdot \Delta h \quad (4)$$

Equation (4) gives the compensation term in true airspeed. It is converted to calibrated airspeed by again using Equation (3), to obtain:

$$\Delta V_c = -\frac{g \cdot V_c^2}{V \cdot V_t^2} \cdot \Delta h \quad (5)$$

where $\Delta V_c$ is the compensation term in calibrated airspeed. In practice, it has been found that assumptions made in deriving the simplified expression of Equation (5) result in some inaccuracy in the energy compensation term $\Delta V_c$. An empirical correction that is a linear function of $\Delta h$ has been determined to compensate for the approximations. When the preferred empirical correction is included, the equation for $\Delta V_c$ is as follows:

$$\Delta V_c = -\frac{g \cdot V_c^2}{V \cdot V_t^2} \cdot \Delta h - 0.005 \cdot \Delta h \quad (6)$$

Energy compensation logic 64 adds the compensation term $\Delta V_c$ to target speed V to produce the energy compensated target speed $V_{TGT}$ that is output to the autopilot via line 40. The compensation term $\Delta V_c$ need not be limited. However, the target speed $V_{TGT}$ is limited to the normal maneuver speed for the airplane flap setting. For moderate excursions above the descent flight profile, the compensated target speed $V_{TGT}$ has been shown to closely track airplane speed with throttles at idle. It is to be noted that in Equations (1)–(6), the term $\Delta h$ is assumed to be positive. If $\Delta h$ is negative, i.e., if the aircraft is below the computed flight profile, no energy compensation term is calculated by energy compensation logic 64, and the target speed $V_{TGT}$ is set equal to the uncompensated target speed V.

There will be circumstances when it is either impossible or undesirable to follow the compensated target speed provided by the present invention. For example, the crew may not wish to decelerate during a leveling off segment, in which case they will disengage the VNAV mode on autopilot 14 and maintain whatever speed is deemed appropriate. Another situation in which the compensated target speed will not be followed is when the aircraft decelerates to the minimum maneuver speed. In either of these cases, additional energy will be added to the airplane. During a subsequent recapture of the descent path, the crew need only compare the current calibrated airspeed shown by airspeed point 30 with the compensated target speed $V_{TGT}$ indicated by airspeed bug 36 to determine when sufficient drag has been applied to dissipate the excess energy. During a PATH mode descent, a message to the crew indicating that drag is required may be provided via CDU 22 in response to a difference between current calibrated airspeed and compensated target speed greater than 10 knots.

While the preferred embodiments of the invention have been illustrated and described, it should be understood that variations will be apparent to those skilled in the art. Accordingly, the invention is not to be limited to the specific embodiments illustrated and described, and the true scope and spirit of the invention are to be determined by reference to the following claims.

The embodiments of the invention in which an exclusive property or privilege is claimed are defined as follows:

1. In an onboard aircraft flight management system that includes means for enabling selection of various flight modes including a descent mode, means for determining a descent path including target speed and target altitude profiles as a function of aircraft position, means for providing information regarding the aircraft's current altitude, current position, current calibrated airspeed and current true airspeed, means operative in the descent mode for providing a target signal representing the target speed for the descent path for the current aircraft position, and display means responsive to the target signal for displaying the target speed, the improvement comprising energy compensation means for adjusting the target speed downward when the current altitude of the aircraft exceeds the target altitude for the current aircraft position.

2. The improvement of claim 1, wherein the target speed is adjusted downward by an amount that is determined such that the current total kinetic plus potential energy of the aircraft is equal to the total kinetic plus potential energy that the aircraft would have were it flying at the target speed and altitude for its current position.

3. The improvement of claim 1, wherein the target speed is adjusted downward by an amount proportional to the difference between the current altitude and the target altitude for the current aircraft position.

4. The improvement of claim 3, wherein the target speed is adjusted downward by an amount $\Delta V_c$ computed according to $$\Delta V_c = - \frac{g \cdot V_c^2}{V \cdot V_t^2} \cdot \Delta h - A \cdot \Delta h$$

where g is the acceleration due to gravity, $V_c$ is the current calibrated airspeed, V is the unadjusted target speed, $V_t$ is the current true airspeed, $\Delta h$ is the difference between the current altitude and the target altitude for the current aircraft position, and A is an empirically determined constant that may have any value including zero.

5. The improvement of claim 4, where the constant A is approximately equal to 0.005.

6. An improved method for operating an onboard aircraft flight management system that includes means for enabling selection of various flight modes including a descent mode, means for determining a descent path including target speed and target altitude profiles as a function of aircraft position, means for providing information regarding the aircraft's current altitude, current position, current calibrated airspeed and current true airspeed, means operative in the descent mode for providing a target signal representing the target speed for the descent path for the current aircraft position, and display means responsive to the target signal for displaying the target speed, the improved method comprising the step of adjusting the target speed downward when the current altitude of the aircraft exceeds the target altitude for the current aircraft position.

7. The improved method of claim 6, wherein the target speed is adjusted downward by an amount that is determined such that the current total kinetic plus potential energy of the aircraft is equal to the total kinetic plus potential energy that the aircraft would have were it flying at the target speed and altitude for its current position.

8. The improved method of claim 6, wherein the target speed is adjusted downward by an amount proportional to the difference between the current altitude and the target altitude for the current aircraft position.

9. The improved method of claim 8, wherein the target speed is adjusted downward by an amount $\Delta V_c$ computed according to $$\Delta V_c = - \frac{g \cdot V_c^2}{V \cdot V_t^2} \cdot \Delta h - A \cdot \Delta h$$

where g is the acceleration due to gravity, $V_c$ is the current calibrated airspeed, V is the unadjusted target speed, $V_t$ is the current true airspeed, $\Delta h$ is the difference between the current altitude and the target altitude for the current aircraft position, and A is an empirically determined constant that may have any value including zero.

10. The improved method of claim 9, wherein the constant A is approximately equal to 0.005.

* * * * *